(12) United States Patent
Sekimoto et al.

(10) Patent No.: US 6,407,776 B1
(45) Date of Patent: Jun. 18, 2002

(54) BROADCASTING PROGRAM DISPLAYING SYSTEM AND PROGRAM DISPLAYING DEVICE FOR RECEIVING AND DISPLAYING A PROGRAM VIDEO AND PROPERTY INFORMATION

(75) Inventors: Nobuhiro Sekimoto, Tsukuba; Yoshito Nejime, Koganei; Takashi Hasegawa, Hachioji; Yasuhiro Akiyama, Ome, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/506,809

(22) Filed: Feb. 18, 2000

(30) Foreign Application Priority Data

Feb. 26, 1999 (JP) ............................................ 11-049653

(51) Int. Cl.⁷ ............................................... H04N 5/445
(52) U.S. Cl. ........................ 348/553; 348/563; 348/569; 725/49; 725/68
(58) Field of Search .................................. 348/553, 552, 348/554, 555, 563, 569, 906; 725/37, 49, 68, 139, 141, 151, 153; H04N 5/445

(56) References Cited

FOREIGN PATENT DOCUMENTS

| | | |
|---|---|---|
| EP | 741495 A2 | 11/1996 |
| GB | 2330474 A | 4/1999 |
| JP | 8-279966 | 10/1996 |
| JP | 9-73385 | 3/1997 |
| WO | WO93/10605 | * 5/1993 |
| WO | WO98/39893 | 9/1998 |
| WO | WO99/35839 | 7/1999 |
| WO | WO00/16551 | 3/2000 |

* cited by examiner

*Primary Examiner*—Sherrie Hsia
(74) *Attorney, Agent, or Firm*—Mattingly, Stanger & Malur, P.C.

(57) ABSTRACT

A method of displaying program-related information while the user views a program video mainly and a broadcasting program displaying device to implement the method without making the user's operation complicated and confusing. A picture plane is constructed by two picture planes having a television picture plane (picture plane 1) for displaying the program video which is outputted from a broadcasting program displaying device and further a property state picture plane as another picture plane (picture plane 2). The program video is displayed to the picture plane 1 and an operation picture plane of the broadcasting program displaying device and the program related-information are displayed to the picture plane 2. A broadcasting program displaying device for two-screen construction has functions for display, recording, replay, reservation recording, and the like in response to an instruction from a device which the user operates.

9 Claims, 20 Drawing Sheets

FIG. 4      301

| number 401 | input 402 | channel 403 | date 404 | starting time 405 | ending time 406 | program title 407 | contents 408 |
|---|---|---|---|---|---|---|---|
| 1 | 1 | 1 | 1998/10/7 | 17:05 | 18:00 | (re) drama "I'm Drummer" 2/12 "Drummer is hard" | (cast) HITACHI TARO, et. al |
| 2 | 1 | 1 | 1998/10/7 | 18:00 | 19:00 | news 4 channel | Prime Minister's visit to the U.S, et. al http://www.tv4ch.co.jp |
| 3 | 1 | 1 | 1998/10/7 | 19:00 | 20:00 | Wednesday special "noodle travelogue" | (cast) HITACHI HANAKO, et. al |
| 4 | 1 | 1 | 1998/10/7 | 20:00 | 20:54 | drama "rebellion of wife" 5/12 "immorality" | (cast) Kokubunji Nanako, et. al |
| ... | | | | | | | |
| 2504 | 9 | 299 | 1998/10/31 | 26:35 | 26:40 | (weather) "music and weather forecast" | (cast) undecided |

FIG. 5  302

| number 501 | input 502 | channel 503 | date 504 | starting time 505 | ending time 506 | program title 507 | contents 508 |
|---|---|---|---|---|---|---|---|
| 1 | 2 | 254 | 1998/7/21 | 17:05 | 18:00 | an emergency discussion "How to enjoy CS digital broadcast" | (cast) Steave HITACHI, et. al |
| 2 | 1 | 9 | 1998/8/23 | 21:00 | 21:54 | drama "TORANTAN" 12/12, "Oh! Fired" | (cast) Ohoka Chuhe, et. al http://www.mufufu.co.jp/trantan |
| 3 | 3 | 126 | 1998/9/14 | 19:00 | 20:00 | sports "today's golf" "cooking is easy" | (cast) Kindaichi Fumio, et. al |
| 4 | 1 | 4 | 1998/10/7 | 19:00 | 20:00 | Wednesday special "noodle travelogue" | (cast) HITACHI HANAKO, et. al |

FIG. 6 303

| number 601 | input 602 | channel 603 | date 604 | starting time 605 | ending time 606 | program title 607 | contents 608 |
|---|---|---|---|---|---|---|---|
| 1 | 2 | 254 | 1998/10/21 | 17:05 | 18:00 | music "bui bui bui" | (cast) Cry Like Laughing, et.al (cast) Satan Nagaya II |
| 2 | 1 | 4 | 1998/10/21 | 20:00 | 20:54 | drama "rebellion of wife" 7/12 "loneliness" | (cast) Kokubunji Nanako, et.al |

FIG. 7 304

| number 701 | video format 702 | video bit rate 703 | audio format 704 | audio bit rate 705 | audio mode 706 | data length 707 | data 708 |
|---|---|---|---|---|---|---|---|
| 1 | 2 | 5 | 2 | 100 | stereo | 266733 | variable length data |
| 2 | 1 | 2 | 2 | 100 | stereo | 288822 | variable length data |
| 3 | 3 | 2 | 2 | 30 | monaural | 100988 | variable length data |
| 4 | 1 | 3 | 2 | 30 | monaural | 102233 | variable length data |

FIG. 9

October 7, 1998 terrestrial wave 4channel 17:00~20:00 — 901

| starting time | ending time | program title | contents |
|---|---|---|---|
| 17:05 | 18:00 | (re) drama "I'm Drummer" 2/12 "Drummer is hard" | (cast) HITACHI TARO, et.al |
| 18:00 | 19:00 | news 4channel | Prime Minister's visit to the U.S, et.al http://www.tv4ch.co.jp |
| 19:00 | 20:00 | Wednesday special "noodle travelogue" | (cast) HITACHI HANAKO, et.al |
| 20:00 | 20:54 | drama "rebellion of wife" 5/12 "immorality" | (cast) Kokubunji Nanako, et.al |

- 801 record/playback
- 802 program reservation
- 803 program arrangement
- 804, 805
- 902 (highlighted row)
- 903 record reservation

BROADCASTING PROGRAM DISPLAYING SYSTEM AND PROGRAM DISPLAYING DEVICE FOR RECEIVING AND DISPLAYING A PROGRAM VIDEO AND PROPERTY INFORMATION

BACKGROUND OF THE INVENTION

The present invention relates to a broadcasting program displaying system and device for displaying many pieces of information to the user without confusion as a broadcasting program video picture plane and a user interface picture plane for controlling a broadcasting program displaying device for the user when viewing a video.

The following displaying techniques have been employed in the prior art to display many pieces of information.

As disclosed in, e.g., Japanese Patent Application Laid-Open No. Hei 8-279966 (published on Oct. 22, 1996), the so-called scroll display has been used. According to this scroll display, a large number of items of display information are displayed onto a virtual display picture plane, which is actually displayed only to an area of a display picture plane, parallel movement is executed in the display area, thereby displaying a partial area where desired information exists.

As disclosed in Japanese Patent Application Laid-Open No. Hei 9-73385 (published on Mar. 18, 1997), the so-called multi-window display has been used. According to this multi-window, display information is functionally subdivided and each subdivided information is displayed as an individual window. Windows are overlapped so as to display any desired window to the most front portion of the picture plane, and to thereby be displayed.

In case of describing data broadcasting services for digital broadcasting, various items of information for related program have been displayed so as to cover the front of a broadcasting program video.

On the contrary, in case of a remote controller which has been generally used, there is displayed only information which is necessary and sufficient to control a finite number of functions (such as time display and modes, e.g., play, fast forward in a broadcasting program display device) which is contained in equipment which is a control target.

SUMMARY OF THE INVENTION

The implementation of digitalization, multimedia, and multichannel have spread in fields peripheral to a television/broadcasting program displaying device such as digital television broadcasting and a television with the Internet connecting function.

This influences the usage of a viewing form what is called a "viewing while displaying another video" such that while displaying program video as an original target of a television and broadcasting program displaying device, a large number of pieces of information other than the program video are displayed. Specifically speaking, an electronic program guide (EPG) is received as digital data as well as broadcasting data, a program which the user wants to view is selected from a great number of programs in the multichannel, the television/broadcasting displaying device is connected to the Internet on the basis of a Hyper Text Markup Language (HTML) for linking information on world wide web, and information relating to the program is accessed, thereby employing the above-mentioned viewing form.

In accordance with the change in viewing form, increasing a large number of items of information which the user obtains, an area to display the information is needed to be extremely large. Thus, the area to display the information is insufficient for a single picture plane of a television. The resolution of normal television receiver might be low in case of displaying a character, so that the character data occupies a relatively large area in a displaying picture plane and further it is apt to come short of displaying picture plane. In order to supplement the area of displaying picture plane, as mentioned above in the description of the prior art, the selective display of information results in increasing an area virtually.

However, the aforementioned prior art is utilized as means for displaying all of the many number of items of information to the same picture plane, and to thereby hidden a part of the program video which should be an original target of the television/broadcasting program displaying device. As a consequence, this might cause a situation such that the user forgets to view the program video and information instead thereof is mainly displayed or the like, that is, a preposterous situation. This also makes the operation complicated and confused, in other words, the user must select his desired information to be displayed, remember the existing place, and the like. Therefore, to allow the program video display to take a main part, the prior art has a problem to be solved that a method of displaying other information should be improved in some way.

Contrarily, remote control enables only instruction or display of a finite number of functions which have been prescribed in advance. Accordingly, in case of adding another function to a video/television device, it is incapable of additionally another instruction or display to operate the function.

It is an object of the present invention to provide a method of displaying information regarding a program when mainly viewing a program video without making the user's operation complicated and confused, and a broadcasting program displaying device to implement the method. It is also an object of the present invention to a user interface which enables the function to be added to the broadcasting program displaying device on software and further instruction to the additional function to be realized.

To solve the problems, according to the present invention, a picture plane is constructed by two-picture plane comprising a picture plane 1 for displaying a program video and further a picture plane 2. The program video is displayed to the picture plane 1 and an operating picture plane and program-related information are displayed to the picture plane 2.

By the construction, a display picture plane is divided into the picture plane for program video and the picture plane for displaying the property information and the action state of the device, and therefore, it is possible to widen a picture plane area whereby the user can view both picture planes at the same time and browse the program-related information and the operating state and auxiliary related information.

Thus, it is capable of easily utilizing the viewing form to view the program video mainly and simultaneously view the related information, preventing the user's operation from being complicated and confusing.

According to the present invention, there is provided a broadcasting program displaying device comprising: a video input unit such as a tuner; an input selector for selecting a program video which is inputted from the video input unit; a video output unit for outputting a video from the input selector; a property information obtaining unit for obtaining program property information as property information regarding the program video; a property information output unit for displaying to the user an action state of the device and program property information which is obtained from the property information obtaining unit as a video; and a control unit for controlling each unit.

Further, the broadcasting program displaying device may have: a storage; a video recording unit for recording the program video, which is selected by the input selector, to the storage; a property information recording unit for recording the program property information, which is obtained by the property information obtaining unit, to a program property information list that is provided to the storage; a property information reproduce unit for obtaining property information of recorded programs, which is arbitrarily designated among the program property information that has been already recorded to the storage; a video replay unit for reading out of the storage, a video of recorded programs, which is arbitrarily designated among videos of the recorded programs that have been already recorded to the storage, and play backing the read-out recorded program video; and a video switching unit for switching the recorded program video from the video replay unit and the selected video selected by the input selector. The aforementioned broadcasting program displaying device may also have an instruction input unit.

Furthermore, the broadcasting program displaying device may have a program execution unit which can execute an arbitrary program, and the state of program execution may be displayed to the picture plane 2, thereby displaying the execution situation of the program.

The user connects to the broadcasting program displaying device with the above-described construction, a device comprising a display (output) device and an input device and a user interface displayed by a second display picture plane. He also operates the broadcasting program displaying device by an input from the interface. Thus, it is possible to provide a broadcasting program displaying device for enabling arbitrary change in action of the broadcasting program displaying device such as replay, recording, and action standby. It is also possible to support to obtain a function and information which relate to the program viewing and are convenient such as obtaining of the program-related information by browsing the world wide web. Further, it is possible to make software version-up, for instance, adding a new function to the broadcasting program displaying device. Moreover, it is capable of providing a broadcasting program displaying device for implementing the automation of actions by a software program.

Note that the program-related property information denote a program outline, in other words, broadcasting channel of each program, time information such as starting time and ending time, title of each program, cast, plot, etc. The program-related property information may include property for describing a person and an object which appear in the program video, further a video, audio, a document, and a drawing for explaining the contents of the program auxiliarily, and a character train and a data string for indicating positions where they exist.

The foregoing construction enables the user to browse a broadcasting station, a channel, starting/ending time, title, contents which relate to a program, and the device to act therein, using the information. The user views the description for a person and an object which appear in the program by a second picture plane which is different from that of the program video, so that the user can understand the program well. Further, the user obtains the description for the person and object which appear in the program by a different service provider and therefore, can understand the program well.

Moreover, it is an object of the present invention to provide a broadcasting program displaying device further comprising a clock, wherein when the user stores the property information which has been already obtained arbitrarily, especially, a channel of the program, and starting/ending time, recording is reserved to be performed automatically. As a consequence, it is able to provide a recording reserving function utilizing the program property information.

It is noted that the above-expressed broadcasting program displaying device may be constructed by employing a personal computer as a core. This enables providing of a broadcasting program displaying device using a personal computer. Accordingly, it is able to utilize a higher processing capacity, add a new function, and widen the life style around the user's program viewing.

It is sufficient to display a part of property information, which is displayed to the picture plane 2, to the picture plane 1 as the necessity may arise. Thus, it is easy to allow the user to recognize especially important information from a program video distributor or the broadcasting program displaying device, and it is able to make the user pay attention.

These and other objects, features and advantages of the present invention will become more apparent in view of the following detailed description of the preferred embodiments in conjunction with accompanying drawings.

BRIEF DESCRIPTION OF THE DRAWINGS

FIG. 4 is an illustrative diagram of a program list;

FIG. 5 is an illustrative diagram of a list of property information of recorded programs;

FIG. 6 is an illustrative diagram of a reservation list;

FIG. 7 is an illustrative diagram of video data of the recorded programs;

FIG. 9 is a diagram of a display example (2) of a property state picture plane (picture plane 2) which shows a program list and program reservation;

DESCRIPTION OF THE PREFERRED EMBODIMENTS

Figure 1:
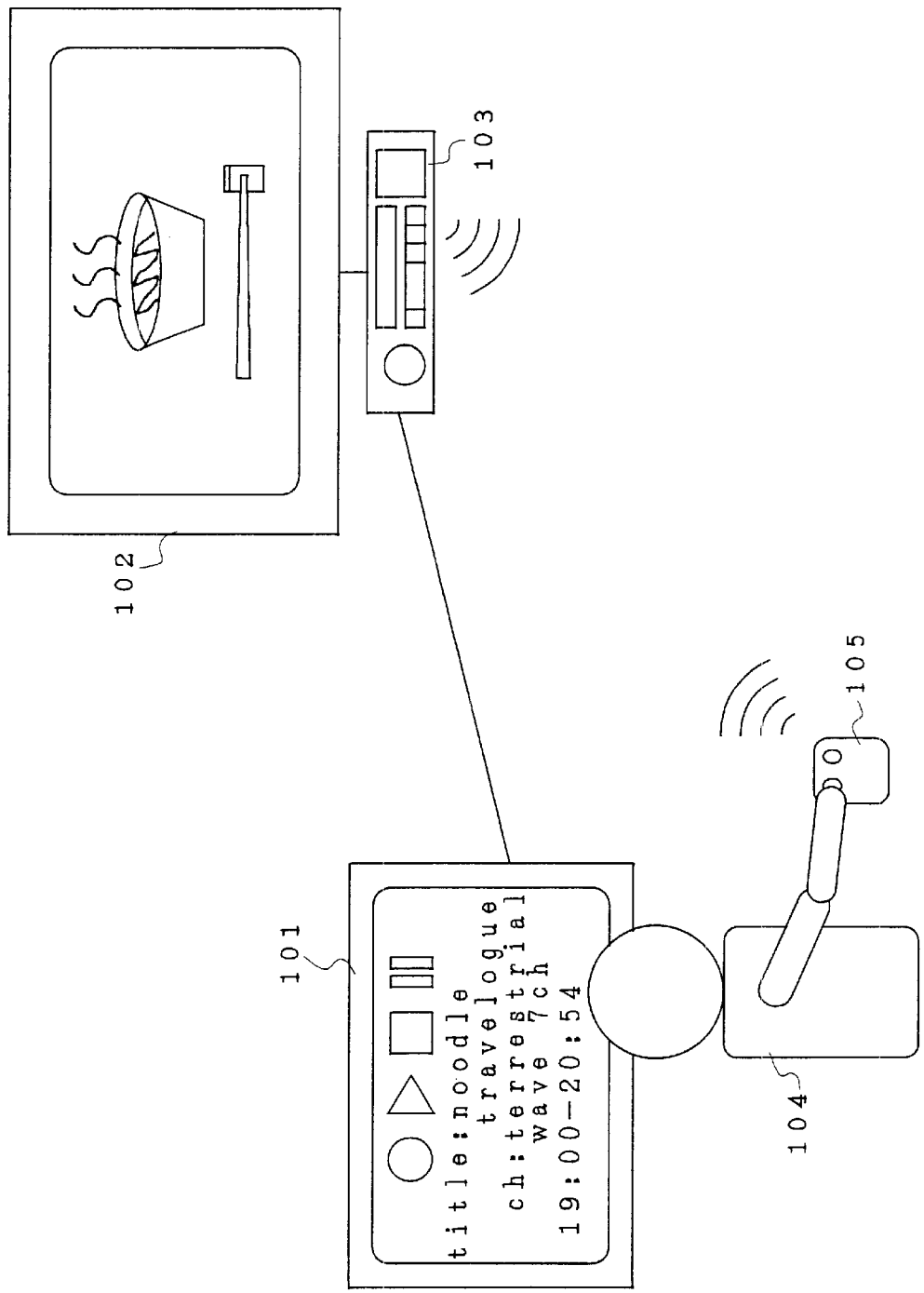
FIG. 1 is an illustrative diagram of an embodiment according to the present invention.

FIG. 1 is an illustrative diagram of an embodiment according to the present invention. In the embodiment, a broadcasting program displaying device of a set top box type will be now described as an example. A program video of a television broadcasting is displayed to a television picture plane 102 through a broadcasting program displaying device 103 and a user 104 views it.

Displayed to a property state picture plane is property information regarding a broadcasting program which is received by the broadcasting program displaying device and displayed to the television picture plane, and an action state of the broadcasting program displaying device itself. In other words, the broadcasting program displaying device displays to a second picture plane which is different from the television picture plane, namely, a property state picture plane 101, an image which is different from the program video. The user supplies an instruction to the broadcasting program displaying device by use of an input device 105 and can change the action state and input an action parameter.

Figure 2:
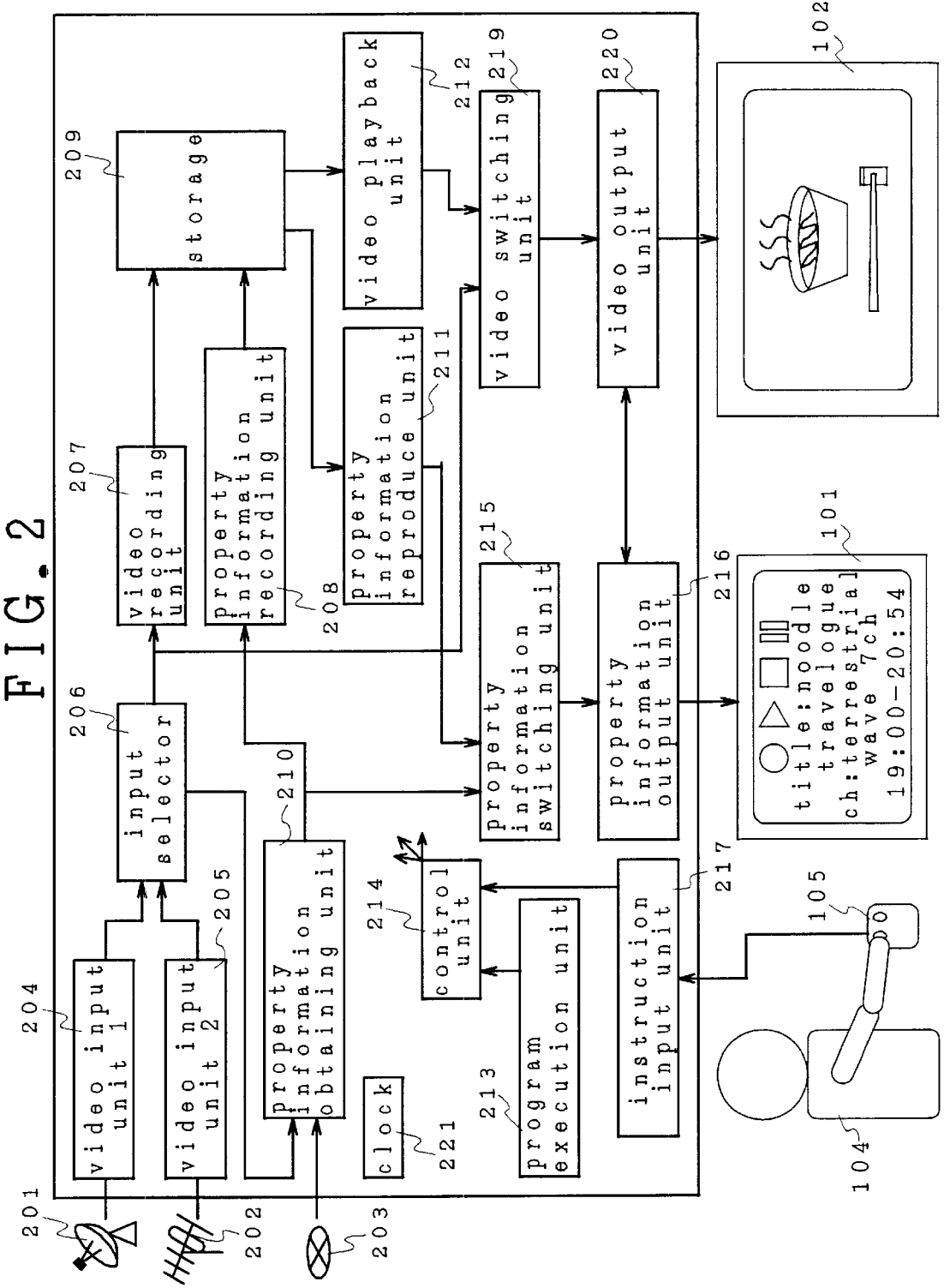
FIG. 2 is a detail view of a broadcasting program displaying device.

FIG. 2 is a detail of the broadcasting program displaying device. Connected to the broadcasting program displaying device is one or more (two in FIG. 2) antennas 201 and 202, and each antenna receives the corresponding electric wave. It is to be noted that dedicated equipment is connected the broadcasting program displaying device with a replacement of the antennas and, thus, it is sufficient to receive data through media different from a television broadcasting, such as a cable television. Video input units 204 and 205 receive an electric wave or the like each of which receives, and convert the received data into data of data format to handle a video in the device. This data format is, for example, an encoded format as an MPEG2 format. An input selector 206 selects a program video according to the user's desire which each of the video input units has been visualized. Incidentally, it is sufficient to stop the action of the video input unit which was not selected at that time. The program video which has been selected is normally subjected to a proper decoding process by a video output unit 220 through a video switching unit 219, visualized as a program video, and displayed to the television picture plane 102. A video recording unit 207 stores, that is, records the program video selected by the input selector 206 to a storage 209 as video data. At this time, data format for the storage is recorded as a data format in the device which has been defined beforehand, what is exemplified is a data format under which data is encoded by an MPEG2 system as video data of recorded programs 304.

By contrast, a property information obtaining unit 210 obtains information via an Internet 203 or property information regarding the received program video. For instance, there are provided services such that the user can browse a time table comprising time of a television program, a channel, and contents by a list format, in a homepage on a world wide web that a corporation or private person opens through the Internet. There are also provided services to multiplex digital data to a broadcasting signal from a terrestrial wave television station and transmit it and, as a CS digital broadcasting, transmit a digitized program list data (EPG: Electric Program Guide) as well as program video data which has been digitized. The property information obtaining unit converts the property information which has been obtained by using the services into internal data of the device. Through a property information switching unit 215, a property information output unit 216 visualizes the transmitted data and also the whole action state of the broadcasting program displaying device. The visualized property information and action state are displayed to the property state picture plane 101. With respect to the property information regarding the program which is recorded, a great number of items of property information, which have been obtained by the property information obtaining unit 210 from the program list service, are recorded to the storage as a program list 301. Incidentally, the property information is properly obtained and recorded, and it is sufficient to update the program list (correct the program list in case of change in elements thereof and delete a program at the time when it has been already finished. The property information is extracted by a property information recording unit 208 and recorded as property information of recorded programs 302. In this case, a number makes video data have a relationship with property information, thereby storing both of them.

An instruction input unit 217 receives an instruction and a parameter input by making use of an input device 105 from the user 104. A control unit 214 utilizes the instruction and parameter, and changes the action state of action units. The processing flow will be specifically explained later on. A program execution unit 213 executes an external program. When the execution of the external program allows the display of the property information output unit to change and the action of the broadcasting program displaying device to change, the instruction to the control unit enables the action to be changed similarly to the case of input from the instruction input unit.

Figure 3:
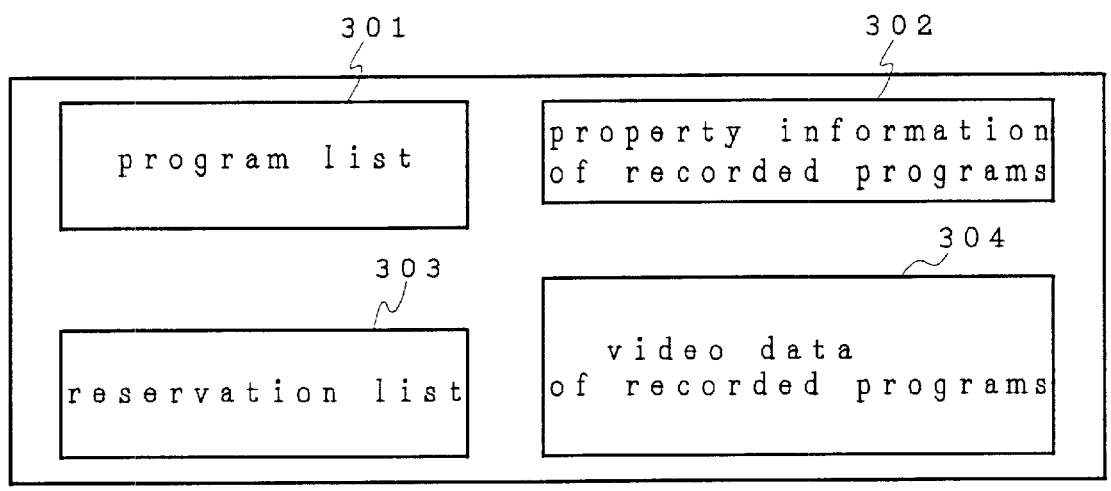
FIG. 3 is an illustrative diagram of a storage.

FIG. 3 is an illustrative diagram of the storage 209. Recorded to the storage 209 are the program list 301, the property information of recorded programs 302, a reservation list 303 and the video data of recorded programs 304. The program list 301 indicates a set of property information regarding numerous program and, as exemplified in FIG. 4, a list format. That is, the list format includes every broadcasting program, a number 401, a broadcasting station (internally identified as a number of a corresponding video input unit 402, a channel 403, date 404, starting time 405, ending time 406, program title 407, and program contents 408. The property information of recorded programs 302 indicates a set of the property information which has been obtained from the program list every program video (video data of recorded programs) that has been recorded to the storage, for example, a list format in FIG. 5. Namely, 302 includes every broadcasting program a number 501, a broadcasting station (internally identified as a number of a corresponding video input unit 502), a channel 503, date 504, starting time 505, ending time 506, program title 507, and program contents 508. The reservation list 303 is stored by the user and denotes a list format composed of a group of information for instructing the device to automatically record the broadcasting program which will be broadcasted hereafter, and what is exemplified in FIG. 6 is a list format comprising property information. That is, the list has every broadcasting program: a number 601; a broadcasting station (internally identified as a number of a corresponding video input unit 602), a channel 603; date 604; starting time 605; ending time 606; a program title 607; and program contents 608. The video data of recorded programs 304 is video data of the broadcasting program which is properly encoded. For instance, the video data of recorded programs is a list in FIG. 7 by which a plurality of program videos can be recorded. Corresponding to each program, the list in FIG. 7 comprises: a number 701; a video format 702; a video bit rate 703; an audio format 704; an audio bit rate 705; an audio mode 706; a data length (size) 707; and actual data 708.

Figure 8:
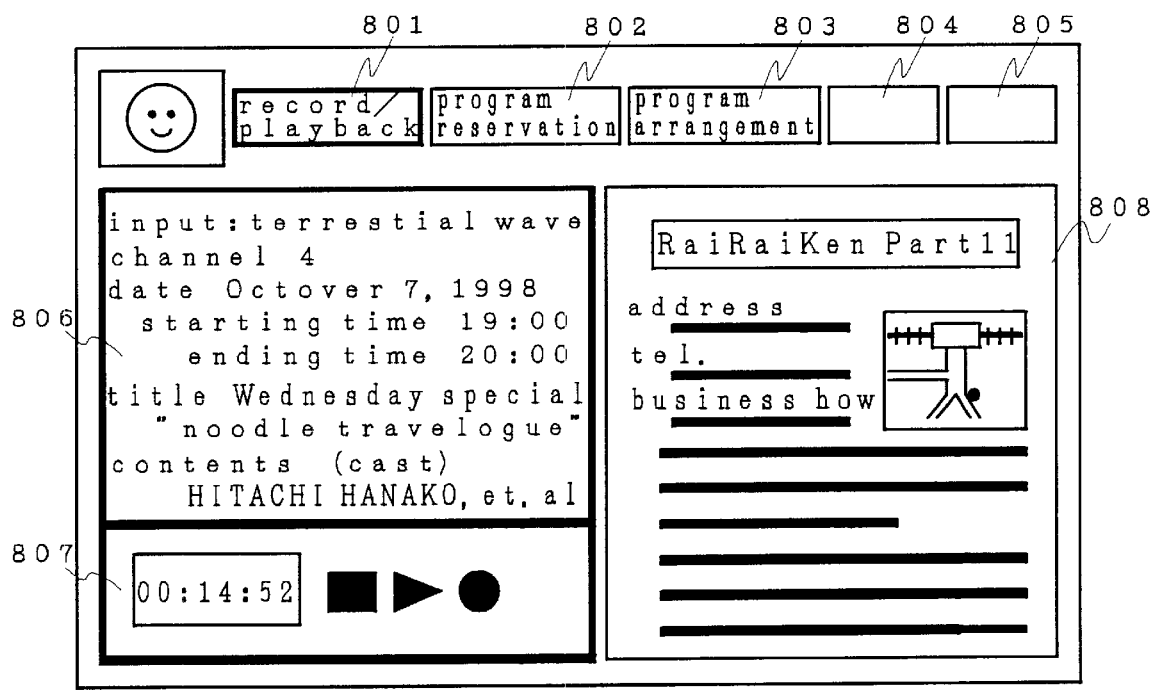
FIG. 8 is a diagram of a display example (1) of a property state picture plane (picture plane 2) which shows record/playback.

FIG. 8 and FIG. 9 show display examples of property information that relates to a broadcasting program which the broadcasting program displaying device receives and displays to a television picture plane, and the action state of the broadcasting program displaying device itself onto the property state picture plane 101. The property information and the action state are displayed on the picture plane, based on a graphical user interface. The user inputs an instruction by the above-explained instruction device (instruction input unit) and operates objects on the picture plane. For instance, the user allows a mouse, etc. to move cursor display corresponding to the position of an object thereto, and be clicked to operate the corresponding object. Thus, in the operable state thereof, the control unit controls each unit and changes the device into the corresponding state. As another example, the control operation is carried out similarly to the occasion that the user presses a corresponding button object when pressing the switch, by a remote controller such that a corresponding state preliminarily corresponds to each switch. As a consequence, the device is changed into the corresponding state. 801 to 805 denote button objects to switch contents which are displayed to the picture plane. 806 displays the property information of the program video which is being displayed to the television picture plane. The property information comprises: an input of a terrestrial wave/BS/CS/etc; a channel; date; starting time; ending time; title; and contents.

Figure 10:
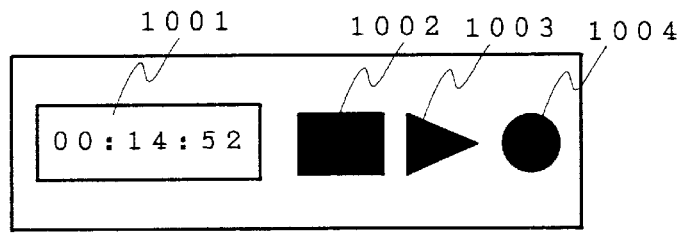
FIG. 10 is an enlarged view of an operating picture plane of an action state.

807 denotes an action state of the broadcasting program displaying device. FIG. 10 shows an enlarged view of an operating picture plane of the action state. In the operating picture plane, there are buttons, text, graphical objects such as a slider which are operated by the user and are to change the action state. 1001 denotes time display during playback, setting the starting time of the program to 0. Referring to FIG. 10, 14 minutes and 52 seconds have passed since the start. 1002 denotes a stop button to stop modes such as replay as will be discussed hereinafter, recording, and the like, thereby entering the standby mode. 1003 denotes a playback button to make designated video which has been recorded enter the replay mode. 1004 denotes a recording button to allow the selector to select the designated program video from the video input unit and set the mode to store (record) the program video to the storage together with the related property information. 808 shows an example in which, in the case where there is an address to a homepage on the world wide web in one part of description of the contents 408 as shown in No. 2 of the program list in FIG. 4 as property information, the property information obtaining unit is employed to access the homepage and obtain data of script of picture plane layout by an HTML, an image, audio, etc. and data is displayed correspondently to the script. Herein, the information relates to "noodle" which appears in the program video and displays the homepage of "RAIRAIKEN" as shop introduction.

FIG. 9 shows a display example of a program list and a case of displaying the program list in FIG. 4 (901 and 902).

If the user designates at least one program in the program list and presses a record reservation button 903, the property information of the designated program is copied to the reservation list 303. The reservation list is estimated as present time upon reservation standby mode and automatically recorded.

Figure 11:
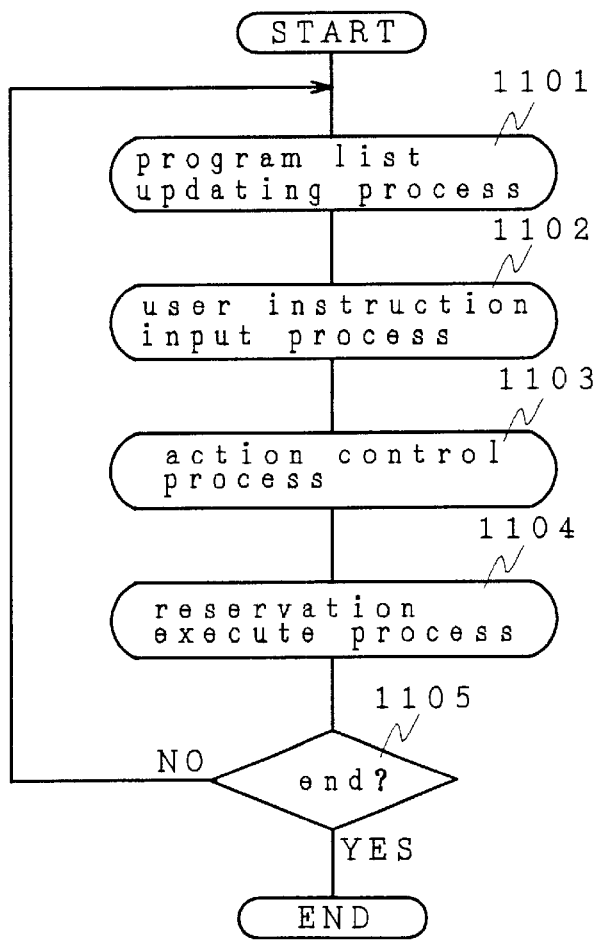
FIG. 11 is a main flowchart in a control unit.
Figure 12:
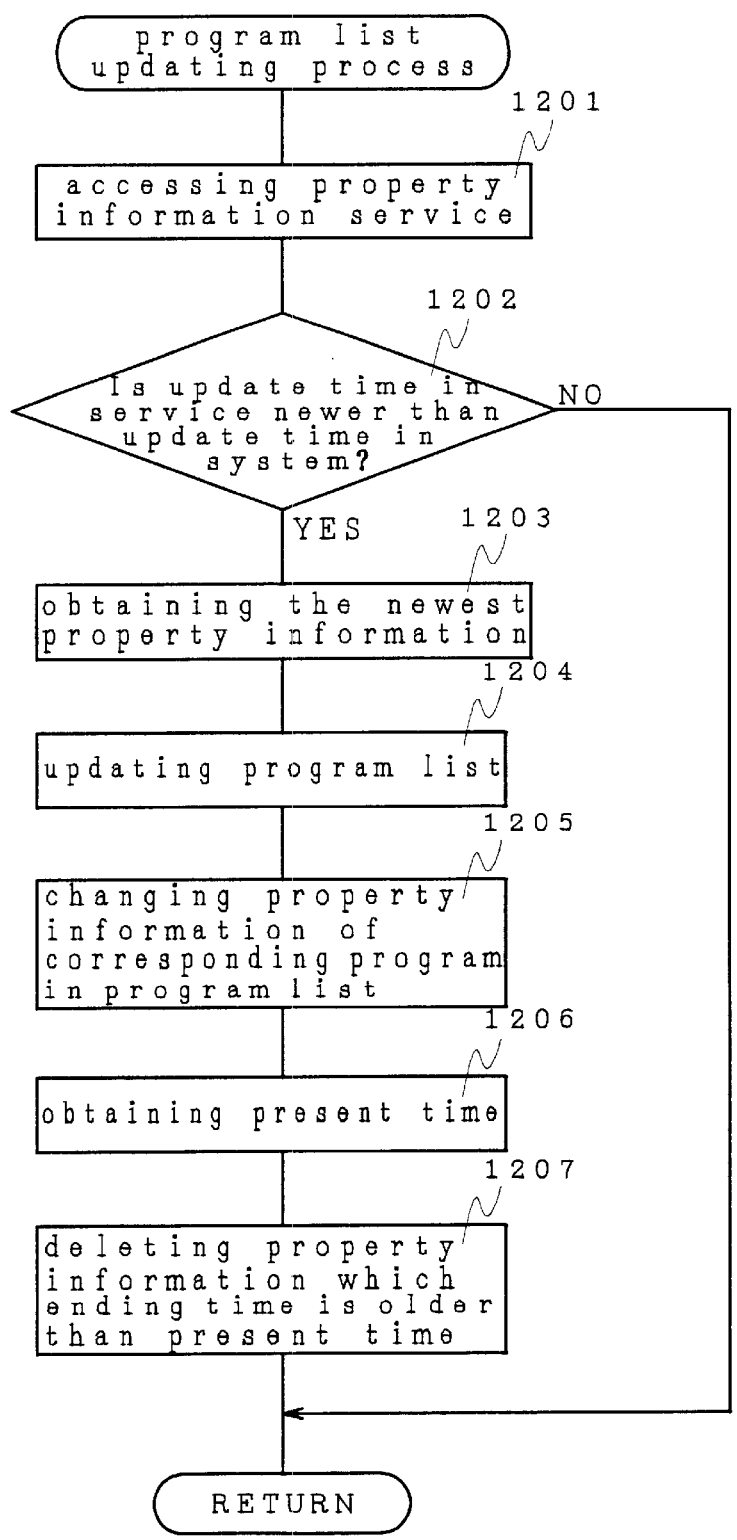
FIG. 12 is a flowchart of a program list updating process in the control unit.

FIG. 11 shows one example of a main flowchart for a process in the broadcasting program displaying device according to the present invention, which is conducted in the control unit. First, the program list is updated (1101). FIG. 12 shows a flowchart example of the program list updating process. The property information obtaining unit 210 accesses a property information service (for instance, homepage of a television or magazine which presents a program list or EPG services of a digital broadcasting) (1201) and compares the program property information which the database of the service has with the program property information in the program list 301 in the device to judge which one of them is newer (1202). As a comparison, if the information in the program list (301) is newer, the process ends. If the information in the service is newer, the newest property information is obtained (1203) and the program list is updated (1204). If the property information in the reservation program list is also updated, the contents are updated (1205). Information of the present time is obtained from a clock (1206) and the property information of a program which has already ended is deleted from the list (1207).

Figure 13:
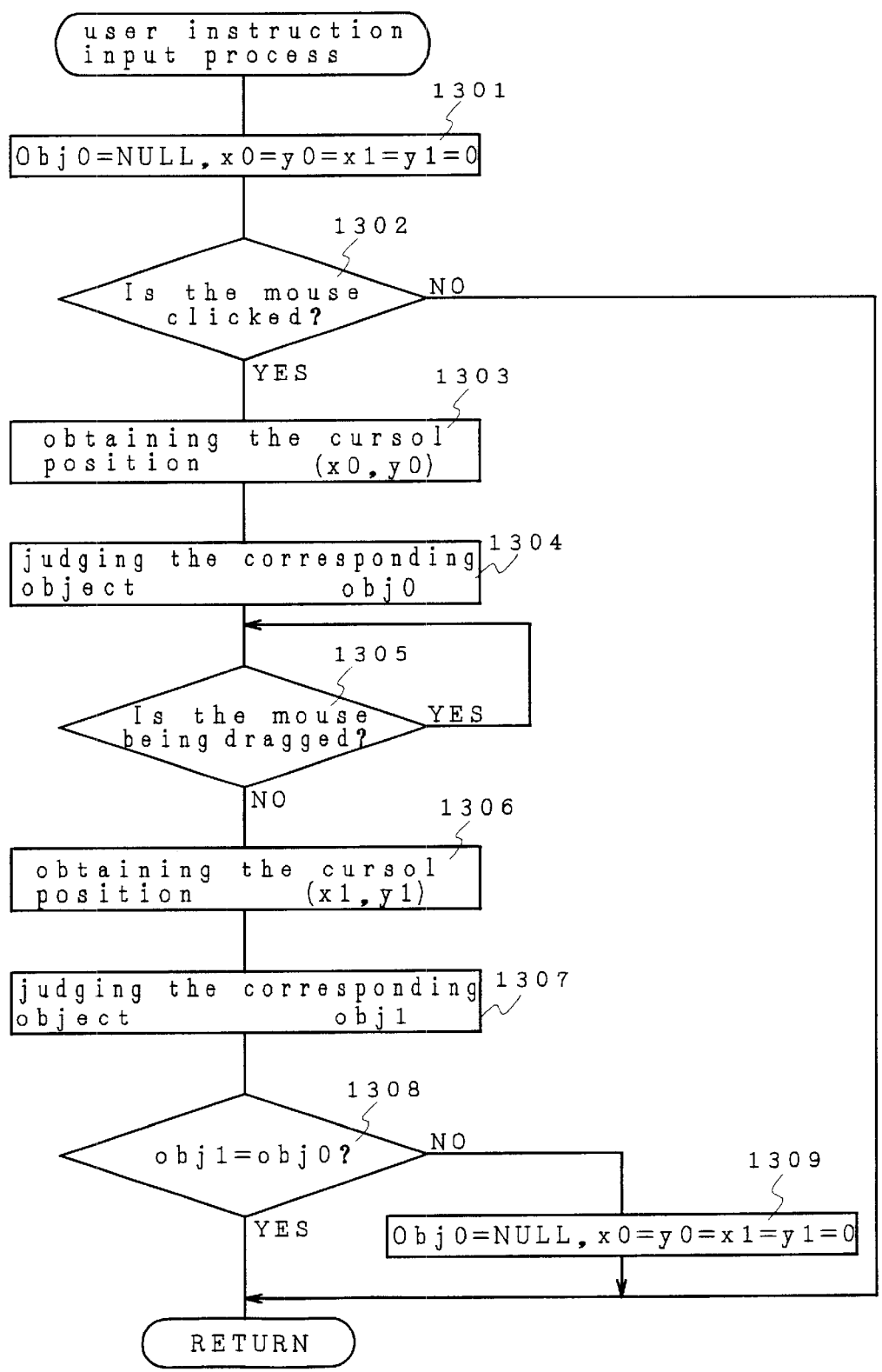
FIG. 13 is a flowchart of an instruction input process in the control unit.

Next, the user performs an instruction input process (1102). FIG. 13 shows a flowchart example of the instruction input process. In this example, as discussed above, it is assumed that the instruction by the user is inputted by the mouse 105 making use of in the graphical user interface system based on the display onto the property state picture plane 101 and the instruction is received from the instruction input unit 217. First, an object which is designated by the mouse and a position thereof are initialized (1301). Unless the mouse is clicked, the process ends, judging that the instruction is absent (1302). If the mouse is clicked, the cursor position is obtained (1303), and it is judged what is a display object Obj0 which has been clicked (1304). If moving the mouse in the state of clicked mouse (dragging), the user waits until the state of clicked mouse is reset (1305). The final mouse cursor position is obtained (1306). An object Obj1 at the final cursor position is judged (1307). If the object Obj1 is different from the object Obj0 (1308), it is judged that the viewer's instruction is error. Values are initialized so as to indicate that there is no instruction which has been discussed above, and the process ends (1309). If Obj1=Obj0, Obj0 and the start and end positions where the mouse has been clicked are transmitted to the subsequent process therefor.

Figure 14:
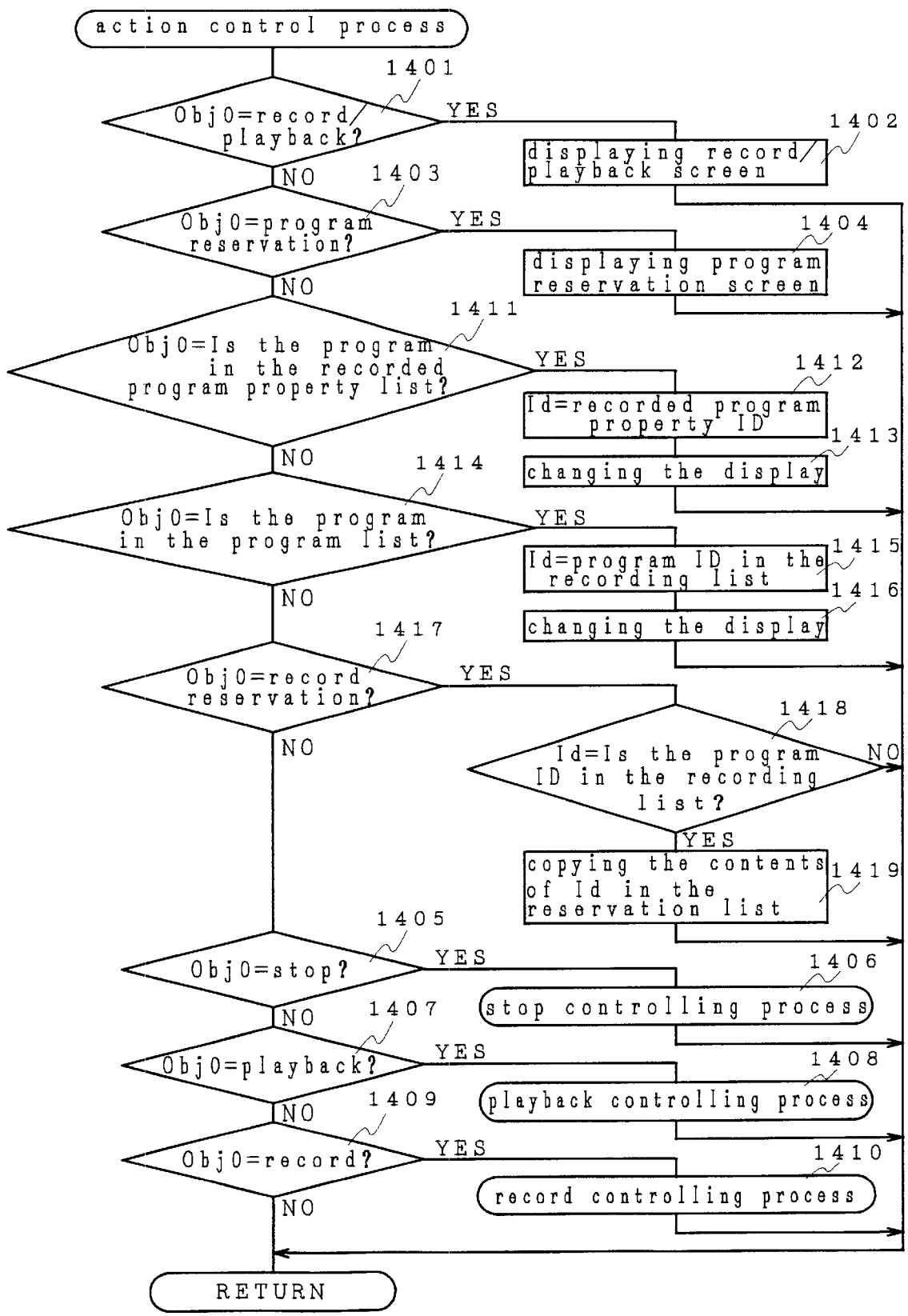
FIG. 14 is a flowchart of an action control process in the control unit.

The successive processing routine turns to an action control process (1103) to control the broadcasting program displaying device by the instruction from the user which has been inputted by the mouse. FIG. 14 shows a flowchart example of the action control process. Fundamentally, it is controlled in the flow of the action control process in a manner such that it is judged which one of the display objects on the property state picture plane 101 is the object Obj0 clicked by the mouse and the device is controlled so that the object Obj0 has meaning which has been preliminarily designated. If the object is the record/playback button 801 (1401), an instruction is issued to the property information output unit 216 so as to display the image as shown in FIG. 8 (1402).

Figure 16:
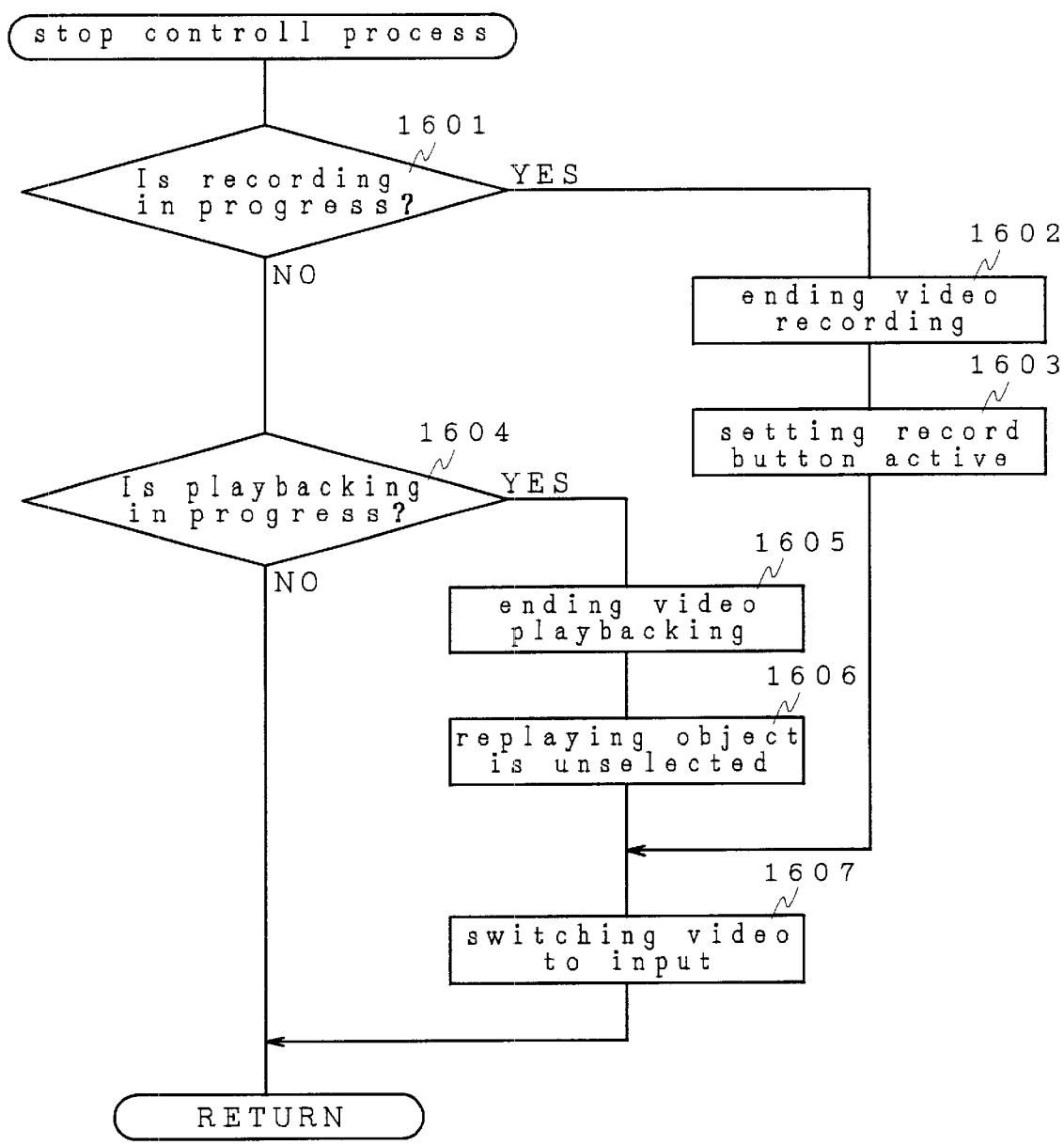
FIG. 16 is a flowchart of a stop control process in the control unit.

If the object is the program reservation button (802) (1403), an instruction is issued to the property information output unit (216) so as to display the image as shown in FIG. 9 (1404). If the object is the stop button 1002 (1405), a stop controlling process is executed (1406). FIG. 16 shows a flowchart example of the stop control process. If the device enters a mode that the recording is in process (1601), the video recording unit is controlled to end the video recording (1602) and an instruction is issued to the property information output unit 216 to set the recording object on the display to be inactive (unselected) (1603). If the device enters a mode that the playbacking is in progress (1604), the video replay unit 212 is controlled to end the video playbacking (1605) and an instruction is issued to the property information output 216 to set a replaying object to be inactive (unselected) (1606). Further, the video switching unit (219) is controlled so that a video to be outputted to the television picture plane becomes an input image which has been selected by the input selector (1607).

If the object indicates one program in the recorded program property information list (1411), a property information variable Id is set to the corresponding program (1412) and the display is changed to see the corresponding program on the display (1413). If the selected object shows one program in the program list (1414), the property information variable Id is set to the corresponding program (1415) and the display is changed to see the corresponding program on the display (1416).

If the object is the record reservation button 903 (1417) and the property information variable Id is a program ID in the recording list (1418), the contents of Id are copied in the reservation list 303 (1419), thereby storing the record reservation.

Figure 17:
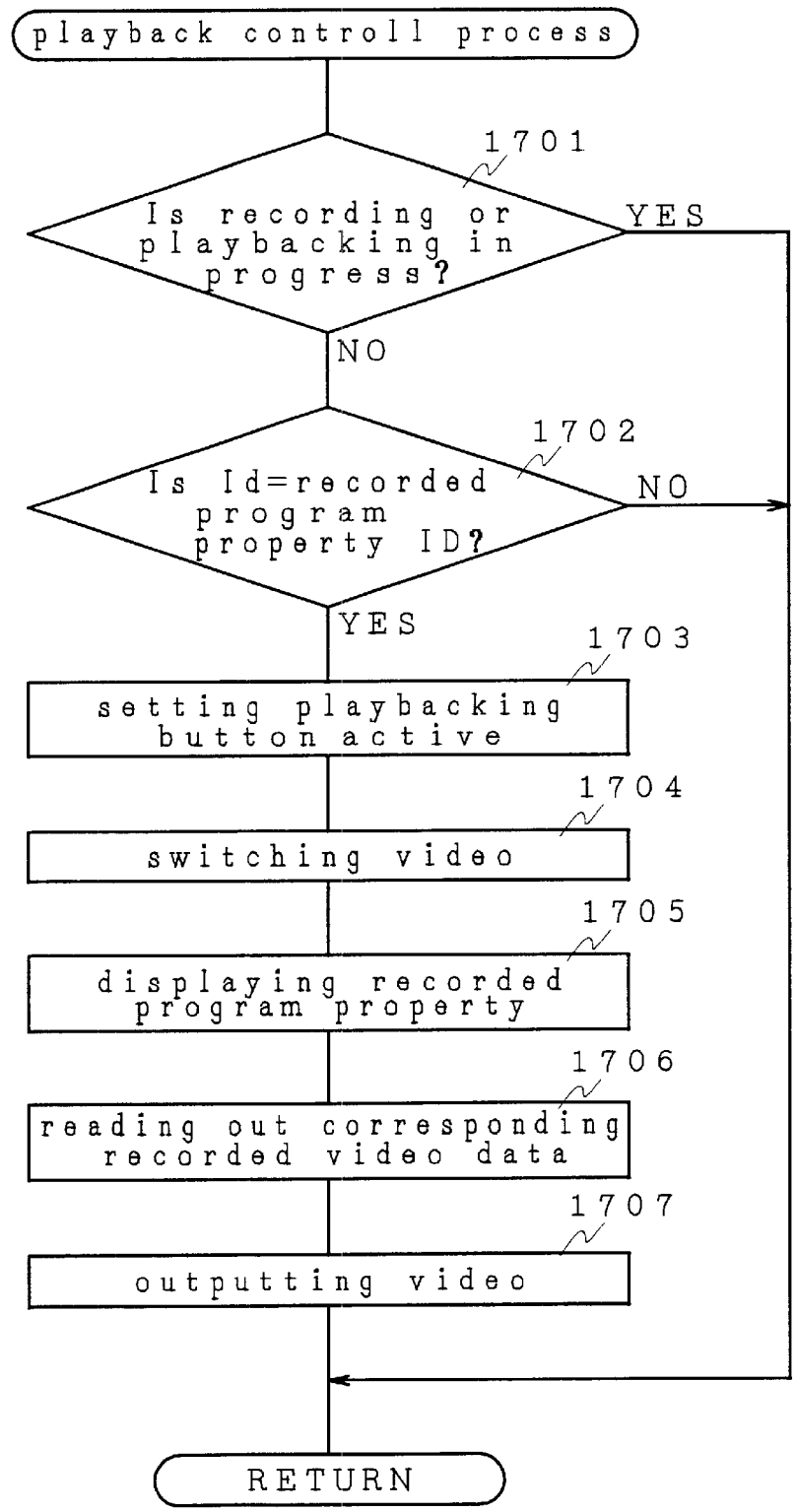
FIG. 17 is a flowchart of a replay control process in the control unit.

If the object is the playback button 1003 (1407), a playback controlling process is performed (1408). FIG. 17 shows a flowchart example of the replay control process. If recording or playbacking is in progress, the process ends (1701). Unless recording or playbacking is in progress, the property information Id which has been obtained is estimated. If the recorded program property ID, namely, the program which has been already recorded is designated (1702), the subsequent process is executed. First of all, an instruction is issued to the property information output unit 216 to set a playbacking button to be active (selected), that is, this shows that the playbacking button is selected on display (1703). The device is controlled so that the video switching unit 219 displays a video from the video replay unit 212 (1704). The device is controlled so that the property information switching unit (215) displays information from the property information reproduce unit (211) (1705). After that, the video replay unit (212) starts replay (1706) and videos from the property information output unit 216 and the video output unit 220 are outputted and displayed (1707).

Figure 18:
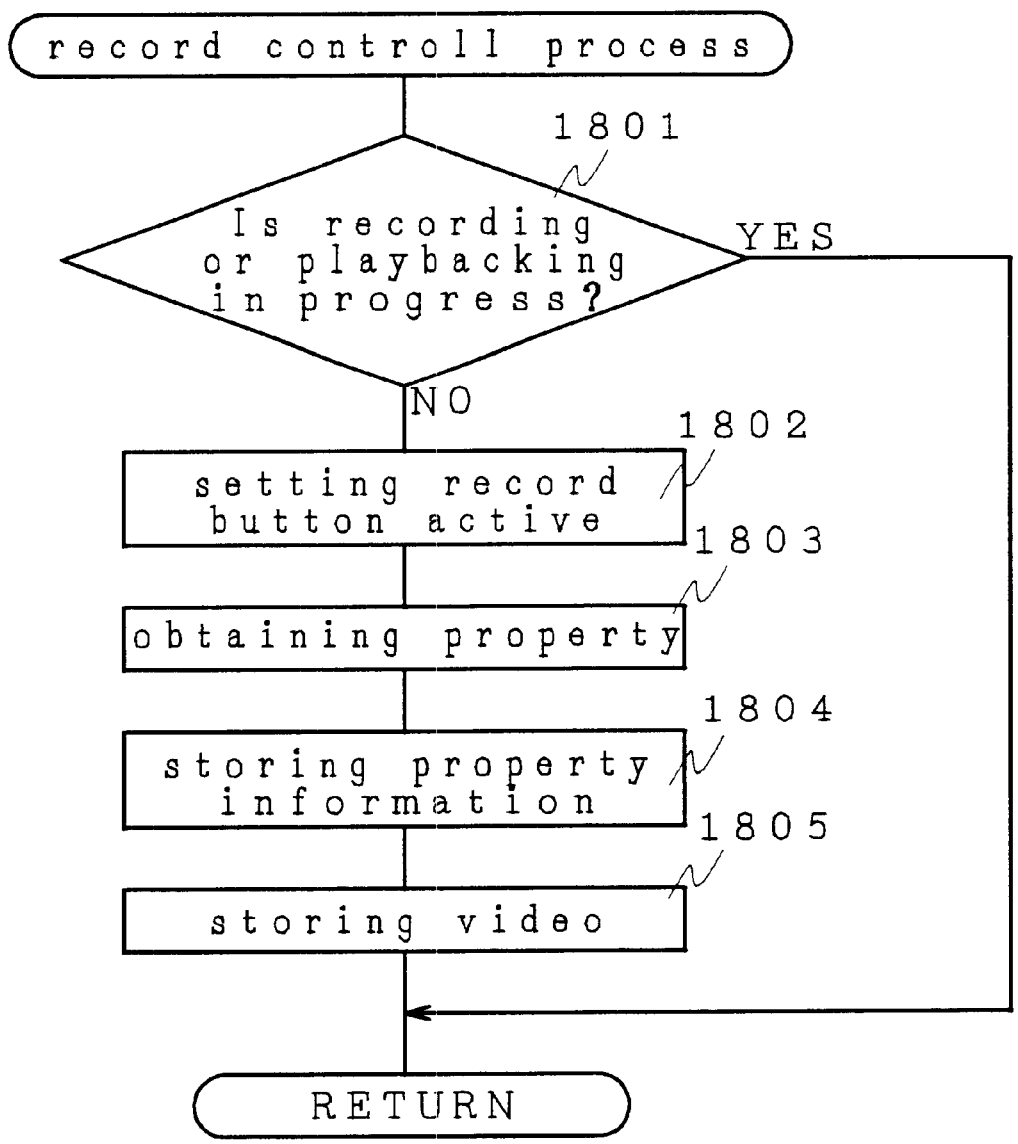
FIG. 18 is a flowchart of a record control process in the control unit.

If the object is the recording button 1004 (1409), a record controlling process (1410) is performed. FIG. 18 is a flowchart example of the record control process. If recording or playbacking is in progress, the process ends (1801). Unless recording or playbacking is in progress, an instruction is issued to the property information output unit 216 to set the recording button to be active (selected), that is, this shows that the recording button is selected on display (1802). The property information of the program which is being inputted at present is obtained from the program list (1803), and stored as the property information of recorded programs (1804) (it is sufficient to copy the information from the program list). The device is thereafter controlled so that the video recording unit 207 starts recording (1805). The record control process is finished and the processing routine is returned to the main flow.

Figure 15:
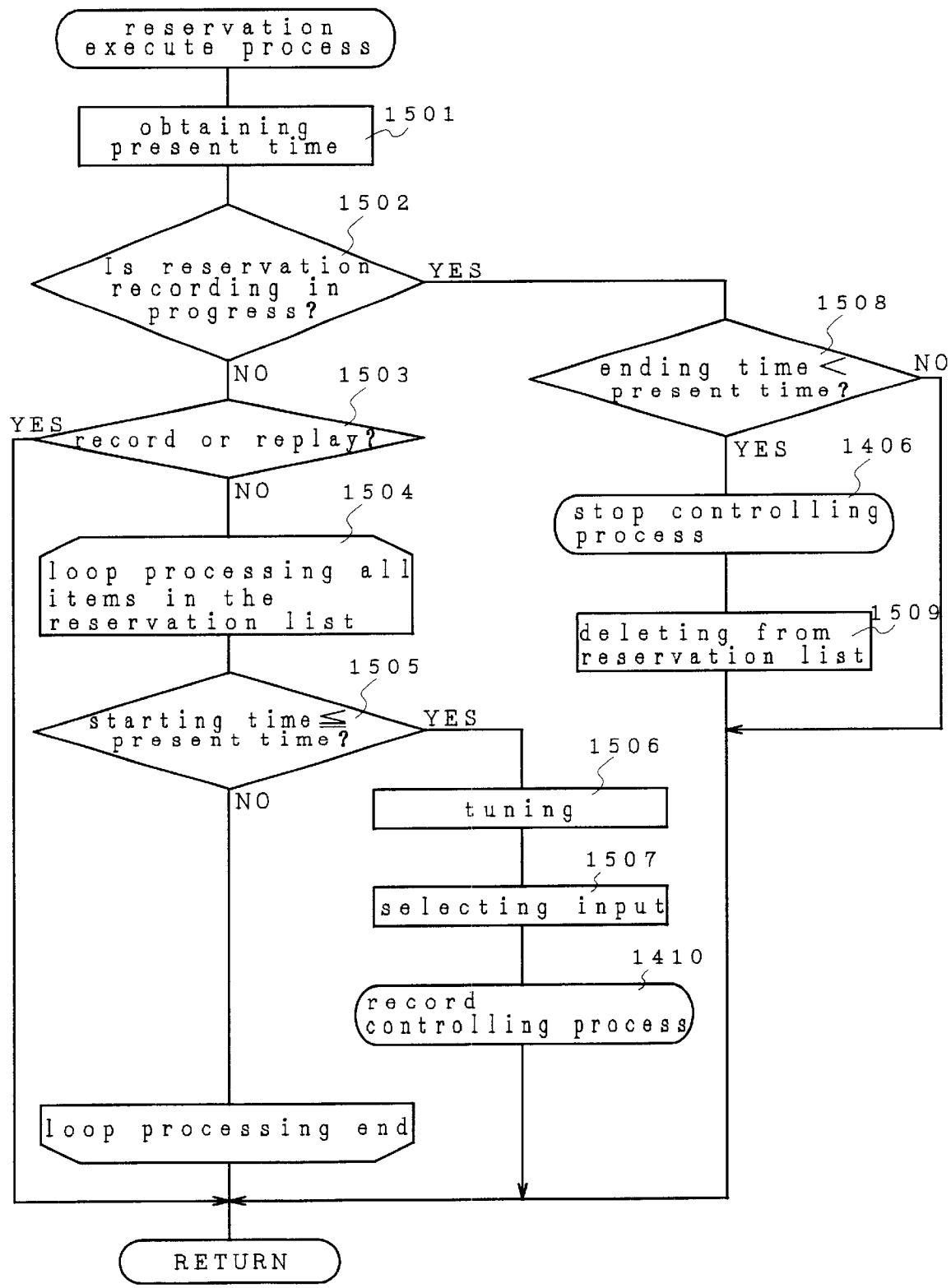
FIG. 15 is a flowchart of a reservation execute process in the control unit.

Successively, a reservation execute process (1104) is performed. FIG. 15 is a flowchart example of the reservation execute process.

To begin with, information of present time is obtained (1501). If the device enters a mode that reservation recording is in progress (1502), the ending time of the property information of the reservation recording is compared with the present time thereof, considering the date (1508). If the present time is before the ending time, the reservation recording is continued all the time. By contrast, if the present time is after the ending time, the foregoing stop controlling process (1406) is executed, and it is judged that the corresponding reservation program is finished and the program is deleted (1509). Unless the device enters the mode that reservation recording is in progress (1502), it is checked to see if the device enters a mode that reservation or replay is in progress, which is set by the user for himself (1503). If YES (1503), the reservation recording is not started and the process ends. If NO (1503), the starting time is compared with the present time among all of the recording reservation programs (property information) in the reservation list (1504), considering the date (1505). If the starting time is after the present time (1505), the present time is not the starting time and therefore the estimation of a noticed recording reservation program recording ends and a next program is advanced. On the other hand, if the starting time is before the present time (1505), the present time has come the recording starting time and, therefore, the device is controlled to set property information to the input (602) and the channel 603 of the noticed property information by tuning the device by the video input units 204 and 205 (1506). The input selector 206 is controlled so as to obtain the corresponding input video (1507). After that, the recording controlling process (1410) is executed and the recording reservation by the user's setting is performed. The successive processes in (1101) to (1104) are executed in sequence in the main flow, and a control operation is conducted so that the broadcasting program displaying device executes the action to be desired for the user. Note that when the user instructs the device to end the control operation by the preset method, the process stops and ends (1105).

Figure 19:
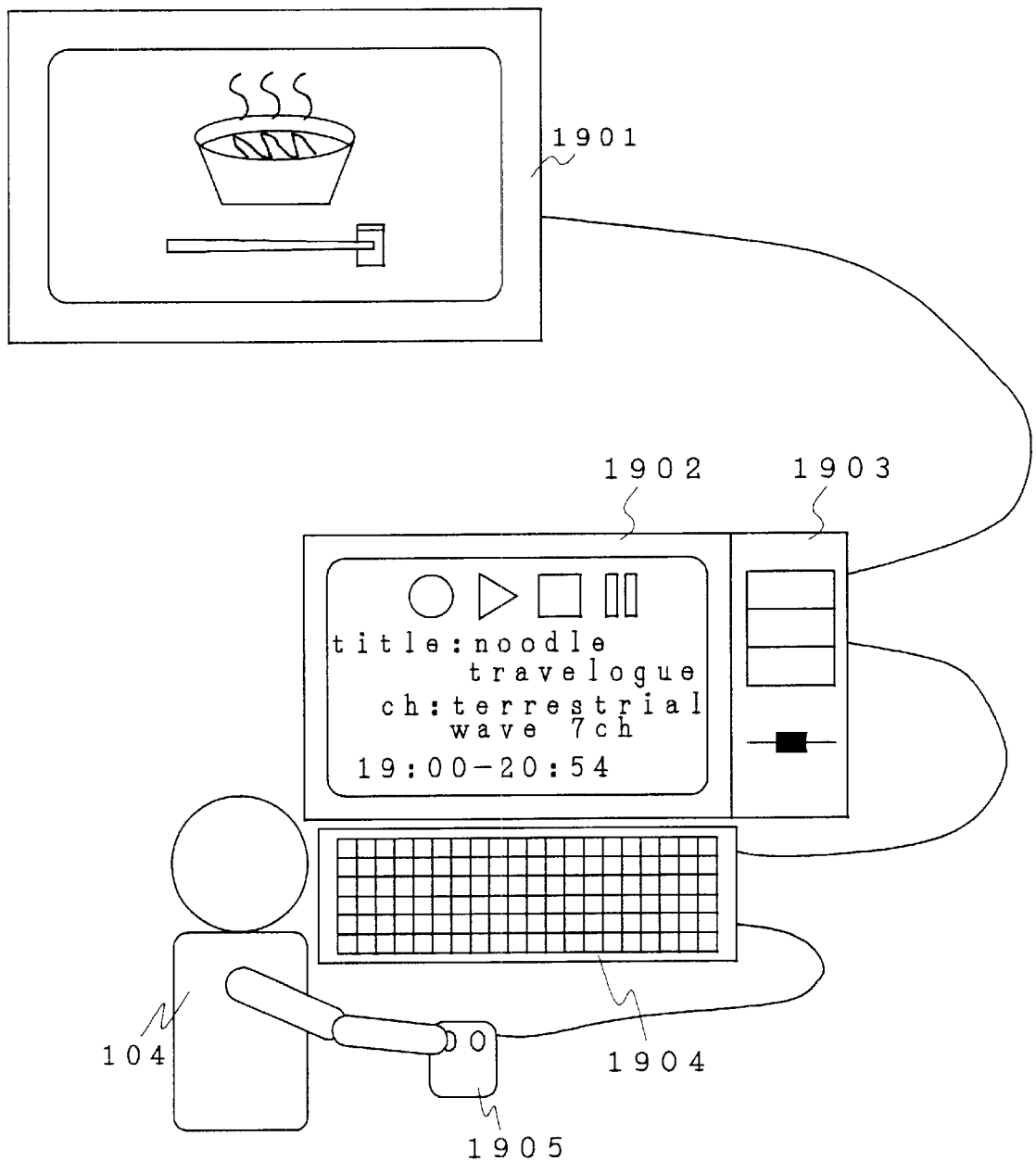
FIG. 19 is an illustrative diagram of a broadcasting program displaying device of a PC type.

FIG. 19 shows a broadcasting program displaying device of a PC type as a second embodiment. In the example, a general personal computer (PC) (1903) is constructed as a broadcasting program displaying device according to the present invention. A PC monitor 1902 is assumed to a picture plane 2 (property state picture plane) and a television picture plane 1901 as a picture plane 1 is connected to the PC and displayed thereto. A PC keyboard 1904 and a mouse 1905 are operated and the user 104 can thus control the PC, namely, broadcasting program displaying device.

Figure 20:
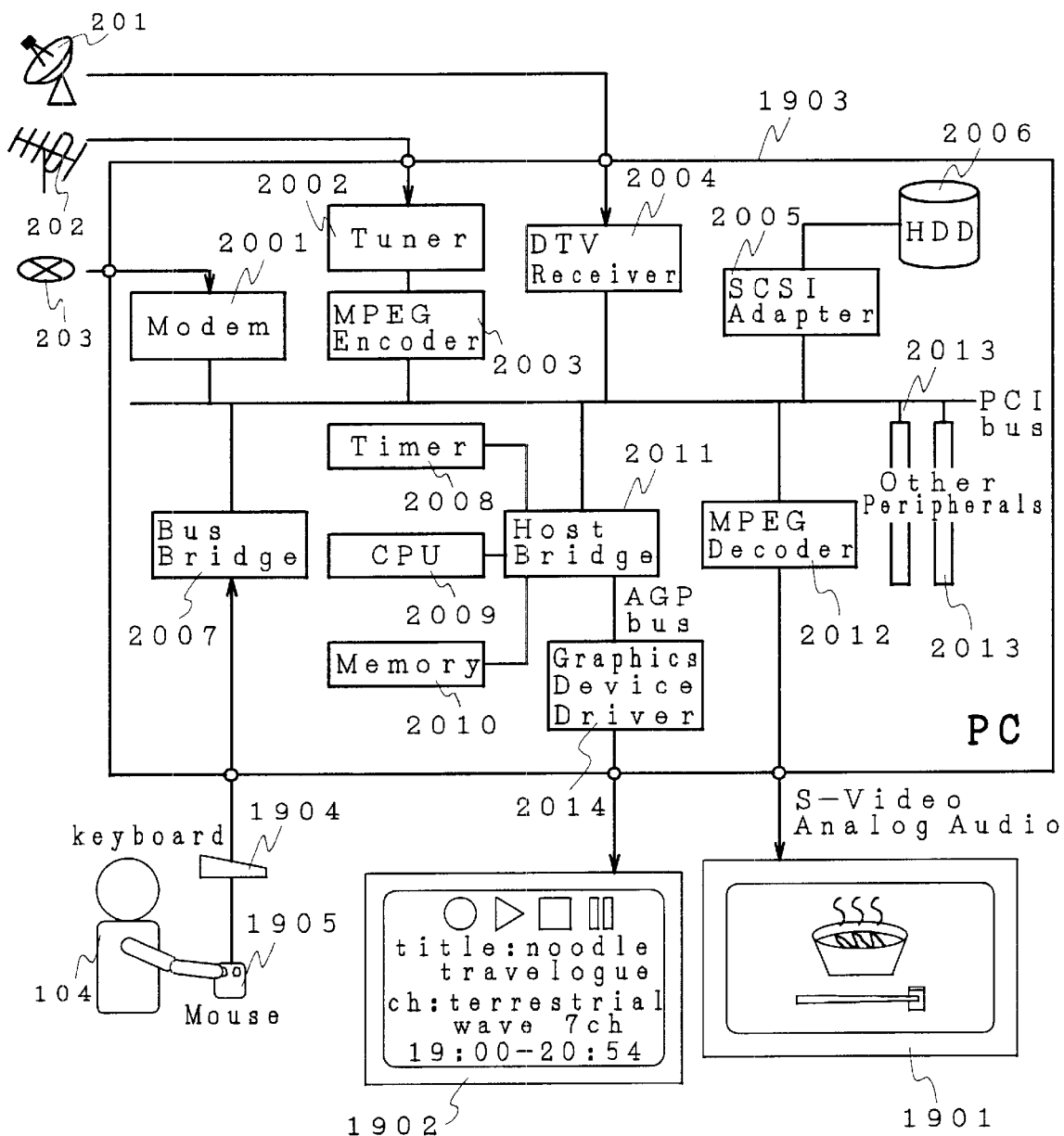
FIG. 20 is a diagram of a detailed internal construction of a broadcasting program displaying device of the PC type and an external connection thereof.

FIG. 20 is a diagram of a detailed internal construction of a broadcasting program displaying device of the PC type and an external connection thereof. The PC has: a CPU 2009; a timer 2008; and a memory 2010, and is connected to a data bus 2013 through a host bridge 2011. The data bus is called, for example, a PCI bus. Connected to the PCI bus is a modem 2001 to connect the PC to the Internet 203, a tuner 2002 to receive and select an analog broadcasting and obtain analog video data, an MPEG encoder 2003 to convert the analog video data into data based on an MPEG, a digital television receiver (DTV receiver) 2004 to receive and select a digital broadcasting and obtain digital video data, an SCSI adapter 2005 to connect a hard disk drive (HDD) 2006, an MPEG decoder 2012 to convert digital video data into analog video data, and other peripherals 2013, which are controlled by the CPU and by which data is received/ transmitted to/from the CPU through the bus. The PC is connected to a keyboard 1904 and a mouse 1905, and data through the PCI bus is mutually reciprocated to the keyboard 1904 and mouse 1905 through an external bus such as a USB bus and a bus bridge 2007. The host bridge 2011 is connected to a graphics device driver 2014 through a fast graphics bus which is called, for example, an AGP bus, thereby connecting the PC to an external monitor 1902, namely, the property state picture plane. An S-video signal is outputted from the MPEG decoder and transmitted to the television screen 1901 as an external device.

When FIG. 20 corresponds to FIG. 2, the CPU corresponds to the control unit 214; the memory the program execution unit 213; the modem the property information obtaining unit 210; the tuner and MPEG encoder the video input unit 2 (205); the DTV receiver the video input unit 1 (204); the hard disk drive and SCSI adapter the storage 209; the bus bridge the instruction input unit 217; the graphics device driver the property information output unit 216; and the MPEG decoder the video output unit 220.

There is operated on the memory an operating system (OS) to control the units by employing the CPU, and the control services are provided to an application program which is also operated on the memory by use of the CPU. The application program uses the services to control the units by the OS, and therefore realizes a logical configuration of the input selector 206, video recording unit 207, property information recording unit 208, property information reproduce unit 211, video replay unit 219, and property information switching unit 215 in FIG. 2. The application program conducts the control flow for the units and data flow in FIG. 11 to FIG. 18 for the units having a logical configuration, thereby constructing the broadcasting program displaying device of the PC type.

Figure 21:
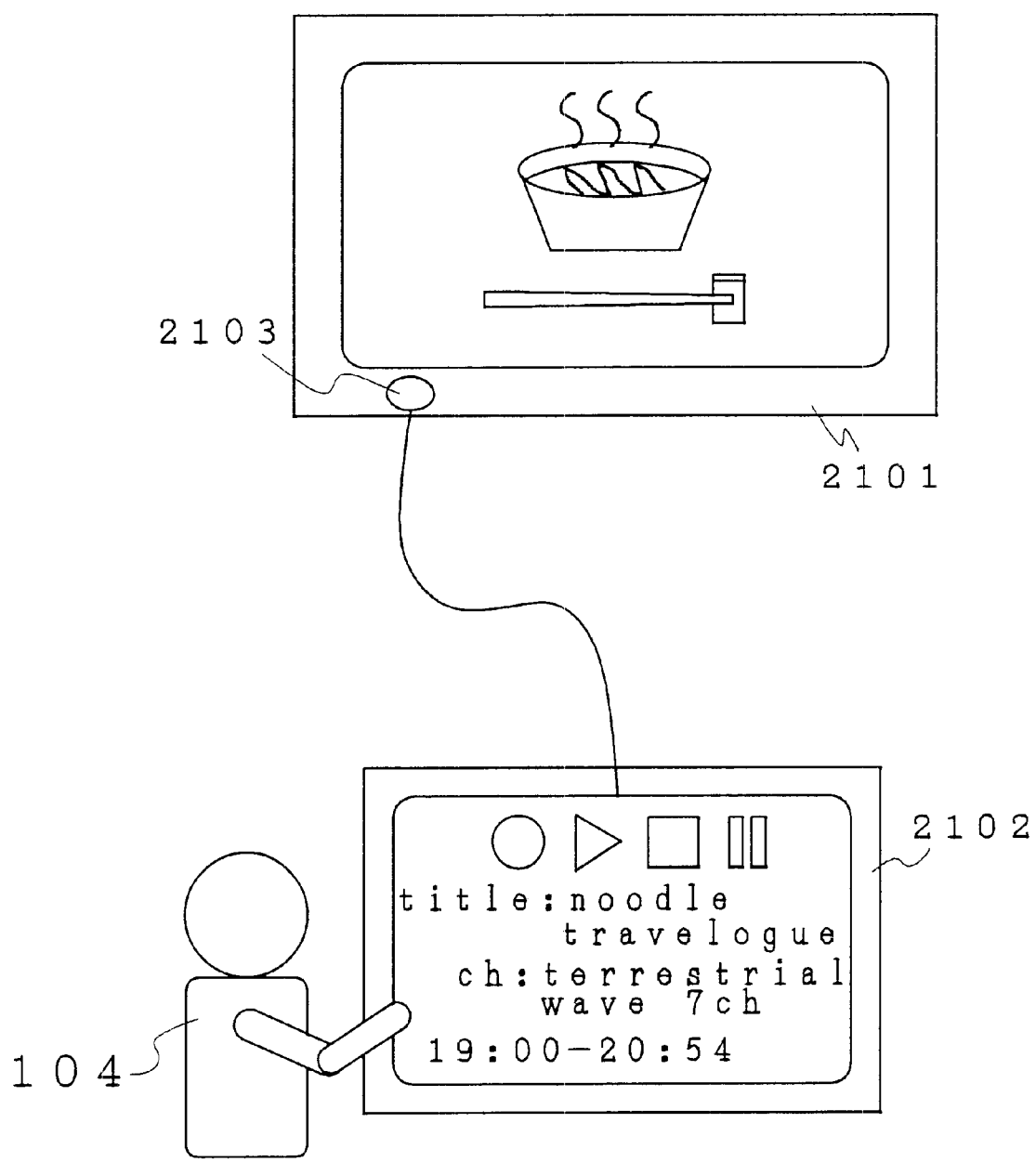
FIG. 21 is an illustrative diagram of a broadcasting program displaying device of a television (TV) type.

FIG. 21 shows a broadcasting program displaying device of a television (TV) type as a third embodiment. In this example, the broadcasting program displaying device and the picture plane 1 of the present invention are constructed by a single device. For convenience, this device is particularly called a broadcasting program displaying device 2101, and a picture plane of thereof as the picture plane 1 is labeled as a television picture plane. The broadcasting program displaying device has a property state picture plane connecting terminal 2103 as a terminal to connect the picture plane 2, namely, a property state picture plane 2102. It is assumed that the property state picture plane 2102 also serves as, for instance, a touch panel whereby an instruction input from the user 104 is possible as well as display.

Figure 22:
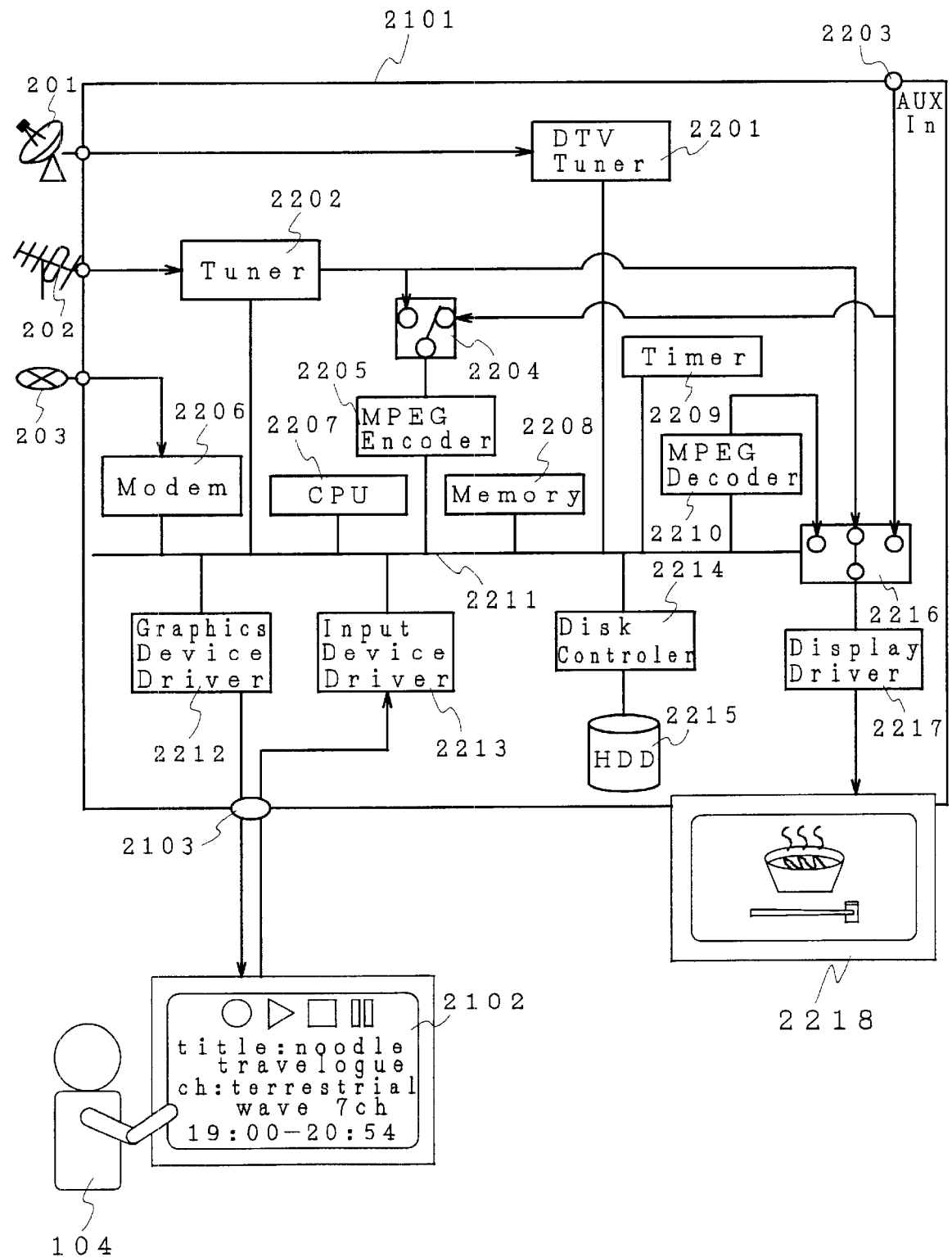
FIG. 22 is a diagram of a detailed internal construction of a broadcasting program displaying device of a TV type and an external connection.

FIG. 22 is a diagram of a detailed internal construction of a broadcasting program displaying device of a TV type and an external connection. The broadcasting program displaying device has therein: a CPU 2207; a memory 2208; a modem 2206 to connect the device to the Internet 203; a digital television (DTV) tuner 2201 to receive a digital broadcasting 201 and select the data and obtain digital video data, based on an MPEG system; an analog television tuner 2202 to receive an analog broadcasting 202 and select the data and obtain analog video data; an MPEG encoder 2205 to convert the analog video data into digital video data based on the MPEG system, a timer 2209; an MPEG decoder 2210 to convert MPEG digital video data into analog video data; a graphics device driver 2212; an input device driver 2213; a hard disk controller 2214; an input selector 2204; and an output switching unit 2216. The above-explained units are connected to a bus 2211 and controlled by the CPU, and data is received/transmitted to/from the CPU through the bus 2211. The hard disk controller 2214 is connected to a hard disk drive (HDD) 2215. The output switching unit 2216 is connected to a display driver 2217 to convert data into a signal which can be displayed, and the converted signal is displayed to a television picture plane 2218.

When FIG. 22 corresponds to FIG. 2, the CPU corresponds to the control unit 214; the memory the program execution unit 213; the modem the property information obtaining unit 210; the tuner and MPEG encoder the video input unit 2 (205); the DTV receiver the video input unit 1 (204); the hard disk drive and SCSI adapter the storage 209; the bus bridge the instruction input unit 217; the graphics device driver the property information output unit 216; and the MPEG decoder the video output unit 220. Herein, the MPEG encoder as the video input unit 2 is located at the post-position of the input selector 2204 so that it is available in common with an external video input 2203.

There is operated on the memory an application program to control the units by employing the CPU. The application program realizes a logical configuration of the video recording unit 207, property information recording unit 208, property information reproduce unit 211, video replay unit 219, and property information switching unit 215 in FIG. 2. The application program is interlocked to the input selector 2204 for analog video and a function for switching digital video as well as analog video is also logically configured. The application program conducts the control flow for the units and data flow in FIG. 11 to FIG. 18 for the units having a logical configuration, thereby constructing the broadcasting program displaying device of the television type. According to the aforementioned embodiments, the broadcasting program displaying system and device of the present invention can be embodied.

The two-picture plane construction enables the picture plane area which the user can view at a time to widen. It is capable of browsing program-related information, an action state, and auxiliary related information. Therefore, the operation is prevented from becoming complicated and confused and it is possible to easily implement the viewing form to mainly view a program video simultaneously with the related information thereof. The related information except for the program video can also be recorded and replayed.

While the present invention has been described above in conjunction with the preferred embodiments, one of ordinary skill in the art would be enabled by this disclosure to make various modifications to this embodiment and still be within the scope and spirit of the invention as defined in the appended claims.

What is claimed is:

1. A broadcasting program displaying system comprising:
   a broadcasting program displaying device for receiving and displaying a program video and property information;
   a picture plane 1 for displaying said program video which is outputted from said broadcasting program displaying device;
   a picture plane 2 for displaying an action state of said broadcasting program displaying device and property information regarding said program video which is being displayed to said picture plane 1 or will be displayed thereto; and
   said broadcasting program displaying device including;
   a video input unit for receiving the program video;
   an input selector for selecting the program video which is inputted from said video input unit;

a video output unit for outputting the selected program video;

a property information obtaining unit for obtaining program property information regarding said program video;

a state property information output unit for converting said program property information into a video and outputting it;

a storage for recording said selected program video and said program property information obtained from said property information obtaining unit;

a property information reproducing unit for obtaining said program property information from said storage;

a video replay unit for selecting a video of recorded programs from said storage and replaying the video;

a property information switching unit for switching said program property information from said property information reproduce unit and said program property information obtained from said property information obtaining unit; and a video switching unit for switching said video of the recorded programs from said video replay unit and said selected video selected by said input selector, wherein said program video corresponds to said program property information and then said program video and said program property information are recorded, and said video of the recorded programs, which has a relation with said property information of the recorded programs that is designated, is replayed.

2. A system according to claim 1, wherein for each broadcasted program video, the property information regarding said program video is constructed by combination using at least one of a broadcasting station or broadcasting channel, broadcasting starting time and broadcasting ending time or broadcasting time indicated by broadcasting hour, a video for describing at least one of a cast in said program video and an outline and audio and a document and a drawing thereof.

3. A system according to claim 1, wherein the property information regarding said program video is program information which is constructed by combination using at least one of a video for describing an object which appears in the program video, audio and a document and a drawing thereof.

4. A system according to claim 1, wherein the property information regarding said program video is a character train or data string which expresses a position, at which there is program information that is constructed by combination at least one of a video for auxiliarily describing contents of the program video, audio and a document and a drawing thereof.

5. A broadcasting program displaying device comprising:

a video input unit for receiving a program video;

an input selector for selecting the program video which is inputted from said video input unit;

a video output unit for outputting the selected program video;

a property information obtaining unit for obtaining program property information regarding said program video;

a state property information output unit for converting said program property information into a video and outputting it;

a storage for recording said selected program video and said program property information obtained from said property information obtaining unit;

a property information reproduce unit for obtaining said program property information from said storage;

a video replay unit for selecting a video of recorded programs from said storage and replaying the video;

a property information switching unit for switching said program property information from said property information reproduce unit and said program property information obtained from said property information obtaining unit;

a video switching unit for switching said video of the recorded programs from said video replay unit and said selected video selected by said input selector, wherein said program video and said program property information are recorded, and said video of the recorded programs, which has a relation with said property information of the recorded programs that is designated, is replayed.

6. A device according to claim 1, further comprising:

a clock for ticking present time, wherein when a user has arbitrarily selected reservation program information by said instruction input unit preliminarily, said reservation program information is stored to a reservation program list which is set to said storage, each distribution time of all reservation program information stored to said reservation program list which are successively obtained is compared with present time of said clock, and while said present time is within a time indicated by said distribution time information, a distribution channel is received in accordance with said reservation information and the program video in said distribution channel is recorded to said storage as a video of recorded program and also said property information of reservation programs is allowed to have a relation with said recorded program video and recorded to a program property list in said storage.

7. A device according to claim 5, wherein said broadcasting program displaying device has a personal computer as a core, which is configured of a CPU, a hard disk, a display, a keyboard and a mouse.

8. A broadcasting program displaying device comprising:

a video input unit for receiving a program video;

an input selector for selecting the program video which is inputted from said video input unit;

a video output unit for outputting the selected program video;

a property information obtaining unit for obtaining program property information regarding said program video;

a state property information output unit for converting said program property information into a video and outputting it;

an instruction input unit for inputting an instruction from a user and data, and for controlling at least one of said input selector, said video output unit, said property information obtaining unit and said state property information output unit, wherein an action state is changed in accordance with an input to said instruction input unit.

9. A broadcasting program displaying device comprising:

a video input unit for receiving a program video;

an input selector for selecting the program video which is inputted from said video input unit;

a video output unit for outputting the selected program video;

a property information obtaining unit for obtaining program property information regarding said program video;

a state property information output unit for converting said program property information into a video and outputting it; and a program execution unit, wherein said program execution unit executes an arbitrary program, and instructs said property information output unit to be executed in accordance with a state of said program.

* * * * *